Figure 1:
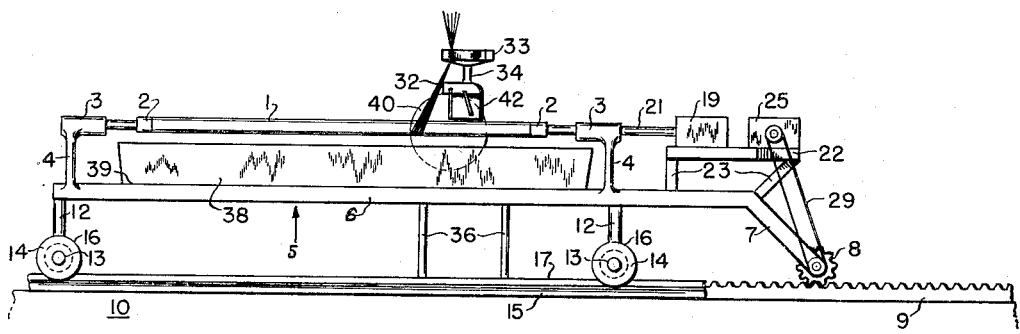

Aug. 8, 1961 L. G. LUNDSKOW 2,995,175
APPARATUS FOR THE APPLICATION OF A LIQUID BINDER
TO A WOUND TUBULAR ARTICLE
Filed Aug. 12, 1957 2 Sheets-Sheet 1

INVENTOR.
LUKE G. LUNDSKOW
BY
Andrus, Sceales & Starke
ATTORNEYS

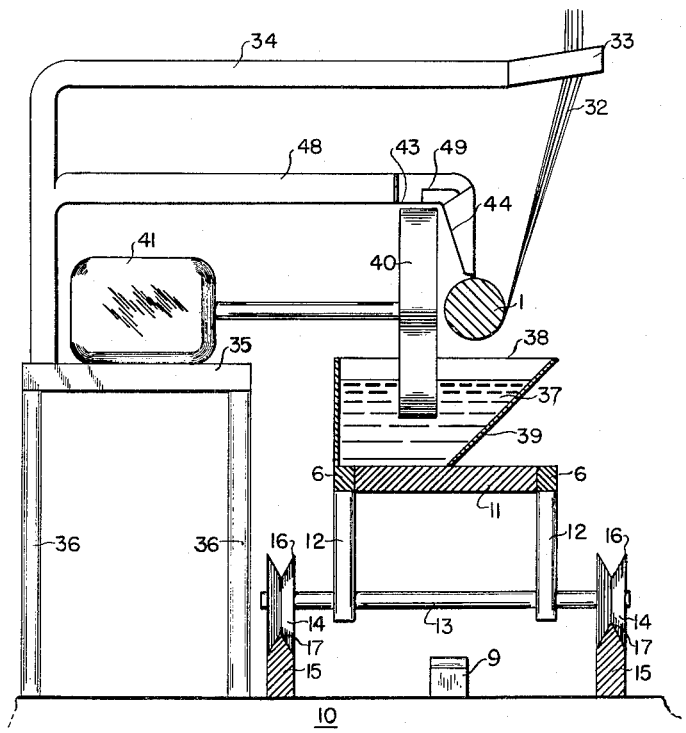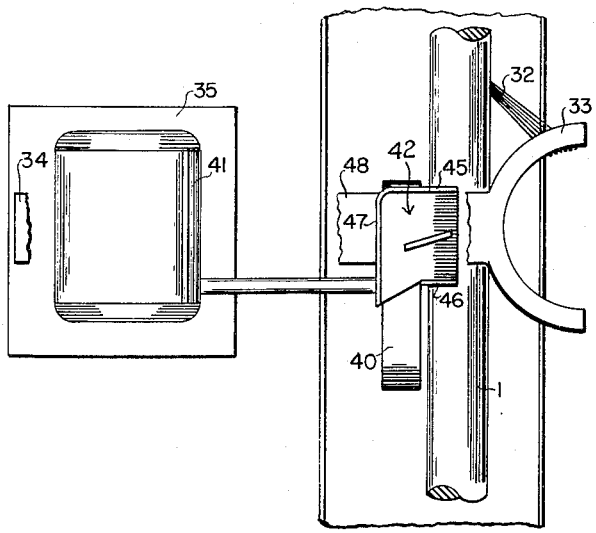

United States Patent Office 2,995,175
Patented Aug. 8, 1961

2,995,175
APPARATUS FOR THE APPLICATION OF A LIQUID BINDER TO A WOUND TUBULAR ARTICLE
Luke G. Lundskow, Milwaukee, Wis., assignor to A. O. Smith Corporation, Milwaukee, Wis., a corporation of New York
Filed Aug. 12, 1957, Ser. No. 677,510
7 Claims. (Cl. 154—1.8)

This invention relates to an apparatus for the application of a liquid binding material to a tubular article being wound from a fibrous material.

Tubular articles, such as pipe sections, are frequently fabricated by winding long reinforcing fibers, such as glass fibers, in a generally helical pattern about a cylindrical mandrel. The fibers are generally impregnated with a liquid uncured thermosetting resin, and on curing of the resin, the fibers are bonded together to form an integral resin-bonded structure.

Generally, the liquid resin is applied either directly to the fibrous strands prior to winding or after winding, to the mandrel itself. Whichever method is used, resin, which has wetted the surfaces or components of the apparatus during winding of the tubular article, will begin to solidify or cure during and after completion of the run. Therefore, it is necessary to remove this resin after completion of a run to prevent it from solidifying on the apparatus. This is a time consuming and burdensome task, necessarily reducing the production time of the apparatus, as numerous surfaces are in contact with or exposed to the resin.

Another consideration in the use of a liquid resin material to bind the fibrous strands together is that a converter and filler are employed with the resin. Unless these materials are thoroughly mixed and uniformly distributed in the resin, a tubular article exhibiting constant physical properties throughout is difficult to attain. For the same reason, additional resin introduced to replenish that used during the winding operation should be thoroughly mixed with that remaining.

The present structure minimizes the problem of resin removal from the various surfaces of the apparatus after completion of a run and insures a homogeneous composition of the resin throughout the winding operation. According to the invention, the resin is contained in a trough-like member extending substantially the length of the mandrel and disposed directly thereunder. The fibrous strand is wound on the mandrel, which is rotated while simultaneously reciprocated in a longitudinal direction, to form the conventional helically wound multi-layered tubular article. As the strands are being wound, the trough reciprocates longitudinally with the mandrel. A rotatable wheel is disposed adjacent to the mandrel and extends into the resin trough. As the wheel rotates, resin adheres to it and is carried upwardly to a point where it contacts a scraper blade which serves to direct the resin downwardly to the mandrel. The longitudinal movement of the trough in combination with the rotating wheel effects a continuous agitation of the resin during the winding operation.

The fibrous strand is directed onto the mandrel by a yoke-like member which also serves to converge the individual filaments, comprising the fibrous strand.

Accordingly, an object of this invention is the application of a resinous liquid to a tubular article being wound from a continuous length of fibrous material with resin contacting relatively few surfaces or parts of the apparatus.

A further object of this apparatus is the provision of means for agitating the resinous liquid prior to and during use thereof to insure a finished product exhibiting uniform physical properties throughout.

Further objects of the invention will appear in the course of the following description.

The drawings illustrate the best mode presently contemplated of carrying out the invention.

Figure 2:
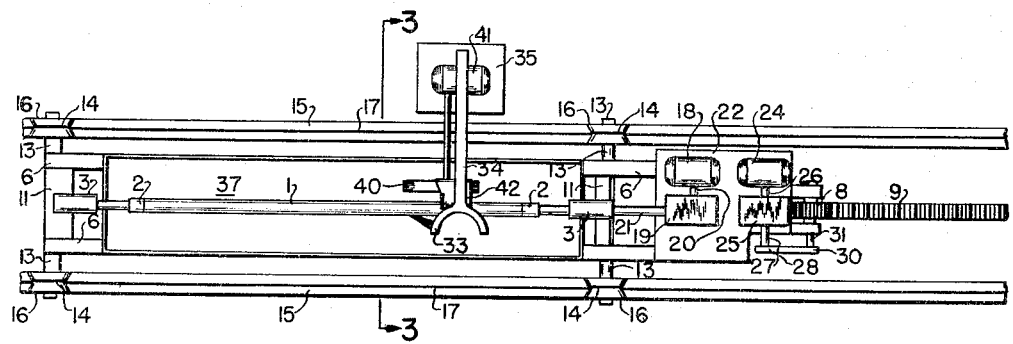

In the drawings:
FIGURE 1 is a side elevation of the apparatus;
FIG. 2 is a top plan view of the apparatus of the invention;
FIG. 3 is a transverse sectional view taken along line 3—3 of FIG. 2 with parts being enlarged; and
FIG. 4 is a top fragmentary view with parts being broken away and enlarged.

The drawings illustrate an apparatus for fabricating a tubular article from a continuous strand of fibrous material. The apparatus consists of a generally cylindrical mandrel 1 provided at each end with mandrel extensions 2 of reduced diameter. Mandrel extensions 2 are rotatably mounted in bearings 3 carried by upright bearing supports 4. The lower end of bearing supports 4 are secured to carriage 5.

The structure of carriage 5 consists of parallel side members 6 which converge at one end and extend downwardly to form arm 7. Gear 8 is rotatably mounted on arm 7 and meshes with rack 9 which is secured to foundation 10. The carriage side members 6 are spaced apart and connected by cross members 11. Legs 12 extend vertically downward from side members 6 to receive axles 13 which serve to rotatably support wheels 14.

As gear 8 is caused to rotate by means to be described, wheels 14 ride on parallel rails 15, secured to foundation 10, to permit reciprocating movement of carriage 5. The bearing surface 16 of the wheels 14 are grooved to allow registry with the complementary upper surface 17 of rails 15.

In order to form the conventional helically wound tubular article, mandrel 1 is rotated while simultaneously reciprocated in a longitudinal direction. Rotation of mandrel 1 is effected by operation of motor 18 which, acting through speed reducer 19 by means of drive shaft 20, rotates output drive shaft 21. The rotary motion of drive shaft 21 is transferred to mandrel 1 by means of mandrel extension 2 which is journaled in bearing 3 and which is connected to drive shaft 21. Motor 18 and speed reducer 19 are supported in position above arm 7 by base plate 22 which is secured to carriage 5 by means of struts 23.

Another motor 24 acting through a similar speed reducer 25 by means of drive shaft 26 rotates output drive shaft 27. Pulley 28 is carried by drive shaft 27 and is connected by means of belt 29 to a similar pulley 30 carried by shaft 31. Shaft 31 also carries gear 8 so that as output drive shaft 27 is rotated, pulleys 28 and 30 cooperate to rotate gear 8 causing carriage 5, as well as mandrel 1, to move in a longitudinal direction. Base plate 22 also supports motor 24 and speed reducer 25.

In order to obtain reciprocating movement of carriage 5 during the winding operation, motor 24 is of the reversible type to permit drive shaft 27 to rotate in either direction. In operation, as gear 8 reaches either limit of travel on rack 9, mechanism of suitable structure, not shown, is actuated to cause motor 24 to reverse its direction of rotation. In this manner, simultaneous operation of motors 18 and 24 will result in both rotation and reciprocation of mandrel 1.

Instead of employing two motors and two speed reducers as described above, the apparatus would work equally well with a single motor and a single speed reducer having two output drive shafts. However, inasmuch as the drive shaft associated with the gear must be reversed to obtain reciprocatory movement of the mandrel, clutching mechanism in the gear reducer would be required.

The fibrous strand 32, composed of a multitude of very fine filaments, is directed unto mandrel 1 by yoke 33. Yoke 33 is disposed above mandrel 1 with the open end of the yoke facing away from a vertical plane through the axis of the mandrel. In order to facilitate concentration of the individual filaments composing fibrous strand 32, the open end of yoke 33 is angled upwardly approximately 10° to the horizontal. The yoke 33 is fixed in this position by support arm 34 which is attached at its lower end to plate 35. Upright supports 36 rising from foundation 10 maintain plate 35 in position.

During winding of the tubular article, the fibrous strand 32 is free to move along yoke 33 depending on the position of mandrel 1. For example, as the mandrel nears its limit of travel to the left, as shown in FIG. 2, strand 32 will be disposed along the left side of the yoke as this position corresponds to the direction of force exerted on the strand by the movement of mandrel 1. As the direction of mandrel movement is reversed and the limit of travel to the right is approached, fibrous strand 32 will proceed along the yoke from left to right ultimately being disposed along the right side of yoke 33. This structure allows the strand, while being contained within fixed limits, to be free to position itself according to the position and direction of travel of the mandrel.

A liquid binding material 37, generally a liquid uncured thermosetting resin, is contained in trough 38 which is disposed immediately below mandrel 1 and extends substantially the length thereof. In order to maintain trough 38 immediately below mandrel 1 during operation so as to collect the excess resin flowing therefrom, trough 38 is mounted on carriage 5 between side members 6. Thus, the trough, carriage and mandrel reciprocate as a unit during winding of the strands.

Trough 38 is provided with a bottom member 39 which is disposed at an angle to a horizontal plane so as to allow resin dripping from the mandrel during operation to drain into a relatively narrow reservoir. The trough presents a relatively wide open portion to the mandrel 1 and yet concentrates the resin within the trough in the reservoir so as to minimize the total amount of resin required for continuous application.

To apply resin 37 contained in trough 38 to mandrel 1, a wheel 40 extends into trough 38 and is partly immersed in the resin 37. Wheel 40 is mounted on the drive shaft of motor 41 which is secured to plate 35. As wheel 40 rotates, resin 37, which adheres to the immersed wheel surfaces, is carried upwardly out of trough 38. As the wheel continues to rotate, a portion of the resin removed from the trough will flow back into the trough and that remaining will be carried upwardly due to the rotation of the wheel.

The adhering resin is removed from the wheel and directed to mandrel 1 by scraper 42 which is disposed above mandrel 1 and wheel 40. Scraper 42 is partly comprised of a flat horizontal plate 43 disposed outwardly of the periphery of the wheel 40 and in close proximity thereto. The plate 43 extends axially of the wheel and terminates in a downwardly inclined portion 44 which is positioned directly over mandrel 1. The distance between the horizontally extending portion of scraper 42 and wheel 40 can be varied depending upon the quantity of resin desired to be directed to mandrel 1. In addition, the amount of resin reaching the surface of mandrel 1 can be varied further by changing the speed of rotation of wheel 40, or by rotating wheel 40 continuously or intermittently and/or changing the amount of resin 37 in trough 38.

Resin which is urged up onto scraper 42 by the rotation of wheel 40 is contained thereon as it flows by gravity down the inclined portion 44 of scraper 42 to mandrel 1 by flange 45, extending along the outer side of scraper 42, and flange 46 disposed along the inclined portion 44 only. Scraper 42 is held in position by means of flange 47 extending along the upper end thereof which is attached to scraper arm 48 by suitable means. Scraper arm 48, in turn, is secured to plate 35.

In order to control the distribution of resin on the mandrel surface, a deflector blade 49 may be provided on the upper surface of scraper 42. Deflector blade 49 extends along the length of the inclined portion 44 of scraper 42 substantially intermediate of the flange 46 and the parallel portion of flange 45 and at an angle thereto so as to form a pair of channels on the scraper surface. The uppermost portion of the deflector blade 49 extends for a short distance along the horizontal plate 43 of the scraper blade 42 so as to intercept a portion of the resin flowing thereon and cause it to be contained within the channel defined by flange 46 and deflector blade 49. The remainder of the resin enters the channel formed by flange 45 and deflector blade 49.

The resin and the materials added to it, namely, the converter and filler, are continually being mixed due to the rotation of the wheel in the reciprocating trough thereby insuring homogeneity in the liquid binding material. Such mixing prevents formation of defective or irregular finished tubular articles which would result from an excess or deficiency of one or more of the materials comprising the liquid binding material in the tubular walls. Due primarily to the relatively smooth surfaces on the wheel, the formation of objectionable air bubbles in the binding material is prevented.

Furthermore, new resin, added to replenish that used during the winding operation, is mixed with that remaining in trough 38 to insure that the composition of the resin used at the outset of the run will be, for all practical purposes, the same as that used upon completion of the run. Not only does this permit each individual length of tubular article to be uniform throughout but it also insures that the entire run will be substantially uniform. This continual agitation serves the further purpose of prolonging the pot life of the resin which is also desirable for purposes of uniformity.

In operation of the apparatus, fibrous strand 32 is fastened to the mandrel 1 and drive shafts 21 and 27 are driven to impart both rotary and longitudinal motion to the mandrel. The motion of the mandrel draws the strand from the yoke and winds the same on the mandrel.

The apparatus is designed so that the mandrel is coated with resin prior to the fibrous strands being wound thereon. Therefore, it is necessary to initially fasten the fibrous strand onto the mandrel at a point adjacent to the resin applicating area or, alternately, start the rotation of the wheel 40 prior to attaching the strand to the moving mandrel. The strands, as they are wound onto the mandrel, are pressed into the resin resulting in better impregnation. This forms a stronger tubular article upon curing due to the fibrous strands being more uniformly impregnated with resin.

In order to accelerate curing and obtain better impregnation of the fibrous strands mandrel 1 may be heated prior to insertion between bearing supports 4. The syrup-like resin upon contact with the mandrel changes to a water-like fluid and tends to run off into the trough where it is re-used. However, enough resin remains on the mandrel to coat the strands as hereinabove described.

When the desired number of layers have been wound, the mandrel is removed, a new mandrel inserted and the operation repeated. Additional resin is added to the trough from time to time throughout the winding operation, either manually or by suitable automatic means.

While the mandrel and trough have been shown here as reciprocating with respect to the wheel and yoke, the apparatus could be arranged so that the mandrel and trough are stationary while the wheel and yoke reciprocate.

The invention provides a novel apparatus for winding long strands into a tubular formation and impregnating the strands with resin to provide an integral composite structure.

Various modes of carrying out the invention are contemplated as being within the scope of the following claims particularly pointed out and claiming the subject matter which is regarded as the invention.

I claim:

1. In an apparatus for the continuous application of a liquid binding material to a tubular article being wound from a continuous strand, a generally cylindrical mandrel, means to rotate said mandrel while simultaneously advancing said mandrel longitudinally, a trough containing said liquid binding material disposed under said mandrel and mounted for longitudinal movement with said mandrel, a wheel extending into said trough and partly immersed in said liquid binding material with the axis of said wheel being in a plane perpendicular to a vertical plane through the axis of said mandrel, means to rotate said wheel to effect continuous removal from said trough of the liquid binding material adhering to the immersed portions of said wheel, means disposed adjacent the periphery of said wheel and disposed to direct a portion of the binding material from said wheel onto said mandrel, and means for directing said strand onto said mandrel after resin has been applied to the mandrel.

2. In an apparatus for application of a liquid binding material to a tubular article being wound from a continuous length of a plurality of strands, a generally cylindrical mandrel, means to rotate said mandrel while simultaneously advancing said mandrel longitudinally, a trough containing said liquid disposed immediately below said mandrel and extending the length thereof, said trough being adapted for longitudinal movement with said mandrel, a wheel extending into said trough and disposed adjacent said mandrel, means for rotating said wheel to effect both removal from said trough of liquid binding material which contacts and adheres to said wheel and agitation of the residual liquid binding material disposed in said trough, a scraper disposed adjacent the upper portion of said wheel to receive liquid binding material from said wheel and direct the same onto said mandrel, and a yoke disposed above said mandrel to converge said strands and direct the same onto said mandrel, the center line of said yoke and the axis of said wheel being in a plane perpendicular to a vertical plane through the axis of said mandrel.

3. In an apparatus for application of a liquid binding material to a tubular article being wound from a continuous length of fibrous material, a generally cylindrical mandrel, means to rotate said mandrel while advancing said mandrel longitudinally, containing means disposed under said mandrel in which said liquid binding material is held and mounted to move longitudinally with said mandrel, a wheel disposed adjacent said mandrel and extending into said containing means, means to rotate said wheel to cause removal from the containing means of liquid binding material adhering to said wheel while at the same time said rotation agitates the liquid binding material remaining in said containing means, means disposed adjacent the periphery of said wheel to receive a portion of the liquid binding material adhering to said wheel and direct it to the surface of said mandrel, and a yoke having an open generally curved end facing away from a vertical plane passing through the axis of the mandrel, said curved end serving to receive and direct the fibrous material onto the mandrel with the fibers being free to position themselves along the extent of said curved end in accordance with the direction of relative longitudinal movement between the mandrel and the yoke.

4. In an apparatus for the application of a liquid binding material to a tubular article being fabricated from a continuous length of fibrous strand wound upon a cylindrical mandrel which is adapted for rotation while simultaneously advancing in a longitudinal direction: a trough containing said liquid binding material disposed immediately under said mandrel and extending the length thereof, said trough being adapted for longitudinal movement with said mandrel; a wheel extending into said trough and immersed partly in said liquid binding material; means to rotate said wheel to effect removal from the trough of liquid binding material adhering to the immersed portion of said wheel; a scraper disposed adjacent said wheel and said mandrel and comprising an upper portion disposed radially outward of said wheel and in close proximity thereto, said upper portion being disposed to receive liquid binding material from said wheel, a downwardly projecting portion terminating immediately above said mandrel and disposed to direct the liquid binding material received by the upper portion of the scraper to the mandrel, and flanges extending along each side of the downwardly projecting portion of said scraper so as to contain the liquid binding material as it flows downwardly to the mandrel; and means to direct the fibrous strand onto the mandrel.

5. In an apparatus for winding a tubular article from a continuous length of a plurality of strands wherein a liquid binding material is used to bind the strands together, a generally cylindrical mandrel, means to rotate said mandrel while simultaneously advancing said mandrel in a longitudinal direction, a trough in which said liquid binding material is contained and having a bottom surface disposed under said mandrel and extending substantially the length thereof, said bottom surface being disposed at an angle to a horizontal plane to permit concentration of liquid binding material in a reservoir of said trough, a wheel extending into the reservoir of said trough and partly immersed in said liquid binding material disposed therein, means to rotate said wheel to effect removal from the trough of liquid binding material adhering to the immersed portion of said wheel, means disposed adjacent said wheel to receive from the wheel a portion of the liquid binding material removed from the trough by said wheel and direct the same to said mandrel, and a yoke inclined upwardly and disposed above said mandrel to converge said strands and guide the same onto said mandrel subsequent to the liquid binding material being applied thereto.

6. In an apparatus for winding a tubular article from a continuous strand wherein a liquid binding material is applied to the strand, a generally cylindrical mandrel supported for rotation by a first supporting structure, means for rotating said mandrel, means carried by a second supporting structure for directing the strand onto said mandrel, means for reciprocating said first and second supporting structures relatively of one another to wind said strand on the mandrel in a generally helical pattern to form the tubular article, a container secured to said first supporting structure adjacent said mandrel and containing a liquid binding material, means secured to said second supporting structure adjacent said mandrel and extending into said container for continuously removing a portion of said liquid binding material from said container, and means secured to said second supporting structure for directing the removed binding material from said last-named means onto said mandrel.

7. In an apparatus for winding a tubular article from a continuous strand wherein a liquid binding material is applied to the strand, a generally cylindrical mandrel supported for rotation by a first support structure, means for rotating said mandrel, a trough containing the liquid binding material and supported under said mandrel by said first support structure, a wheel supported for rotation within said trough by a second support structure, means for rotating said wheel to effect removal from the trough of liquid binding material adhering to the wheel, a scraper supported adjacent said wheel by said second support structure and including a generally horizontal portion disposed immediately outwardly of the periphery of said wheel and having a downwardly projecting portion terminating immediately above said mandrel to permit gravity feed to the mandrel of the liquid binding material which has been urged onto the generally horizontal portion of said scraper by the rotation of the wheel, means supported by said second supporting structure for guiding and directing the continuous strand onto said mandrel, and means for reciprocating said first and second support structures relatively of one another to wind the strand on the mandrel in double helical fashion.

References Cited in the file of this patent

UNITED STATES PATENTS

| | | |
|---|---|---|
| 1,416,840 | Kraut | May 23, 1922 |
| 1,578,356 | Owen | Mar. 30, 1926 |
| 1,764,546 | Burnley | June 17, 1930 |
| 1,834,435 | Steere | Dec. 1, 1931 |
| 2,373,638 | Perkins | Apr. 10, 1945 |
| 2,422,234 | Goldman | June 17, 1947 |
| 2,455,362 | Garrett | Dec. 7, 1948 |
| 2,557,932 | Baymiller | June 26, 1951 |
| 2,578,427 | Hussey et al. | Dec. 11, 1951 |
| 2,656,873 | Stephens | Oct. 7, 1953 |
| 2,718,583 | Noland et al. | Sept. 20, 1955 |
| 2,729,268 | Broughton et al. | Jan. 3, 1956 |
| 2,731,376 | Rusch | Jan. 17, 1956 |
| 2,747,649 | Reed | May 29, 1956 |
| 2,764,218 | Richards | Sept. 25, 1956 |
| 2,862,541 | Brink | Dec. 2, 1958 |